No. 805,139. PATENTED NOV. 21, 1905.
H. K. HITCHCOCK.
MANUFACTURE OF GLASS.
APPLICATION FILED JUNE 13, 1904.
2 SHEETS—SHEET 1.
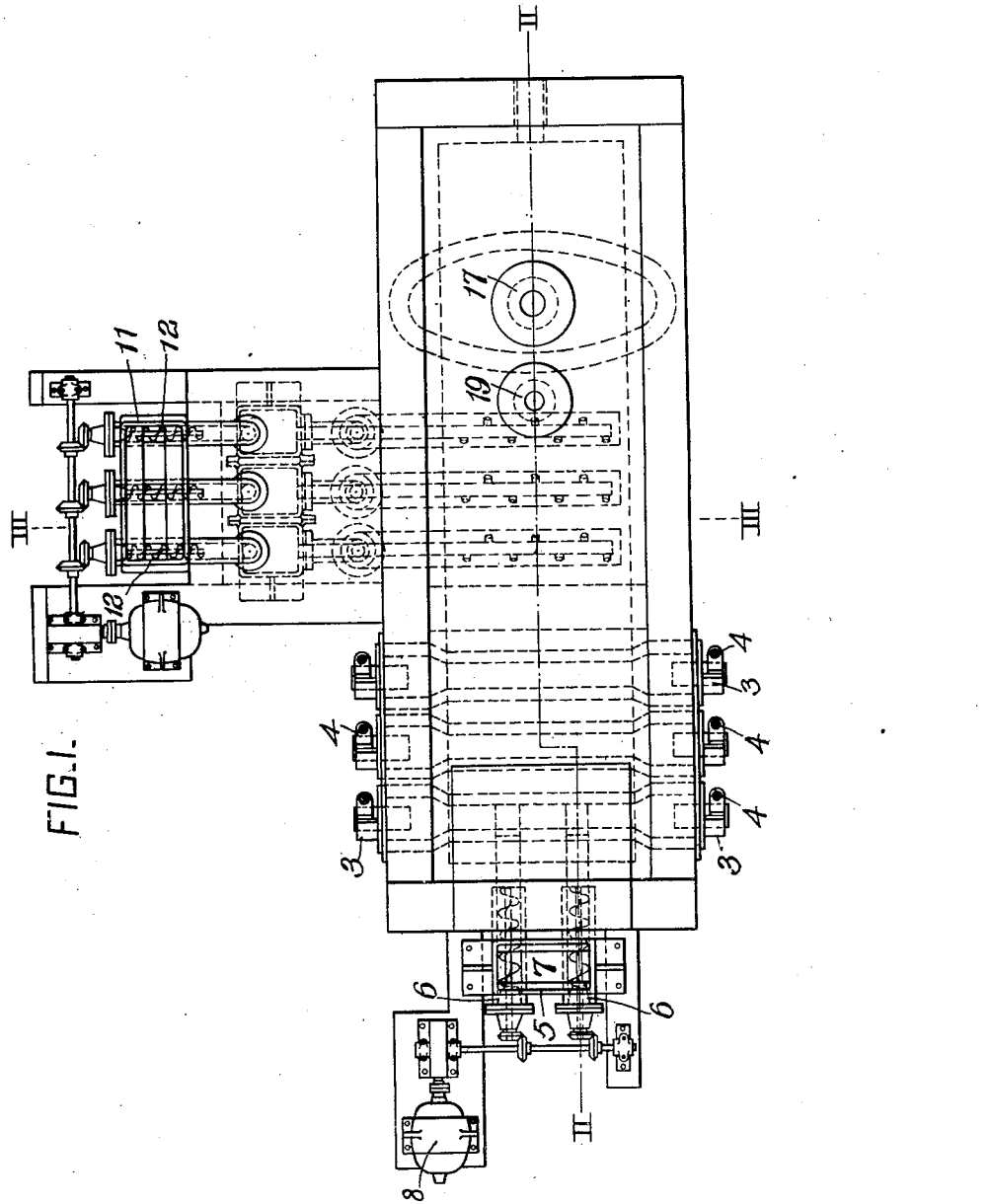
FIG.I.
WITNESSES:
Herbert Bradley
Fred Kirchner
INVENTOR
Halbert K. Hitchcock,
by Christy & Christy, Att'ys No. 805,139. PATENTED NOV. 21, 1905.
H. K. HITCHCOCK.
MANUFACTURE OF GLASS.
APPLICATION FILED JUNE 13, 1904.
2 SHEETS—SHEET 2.
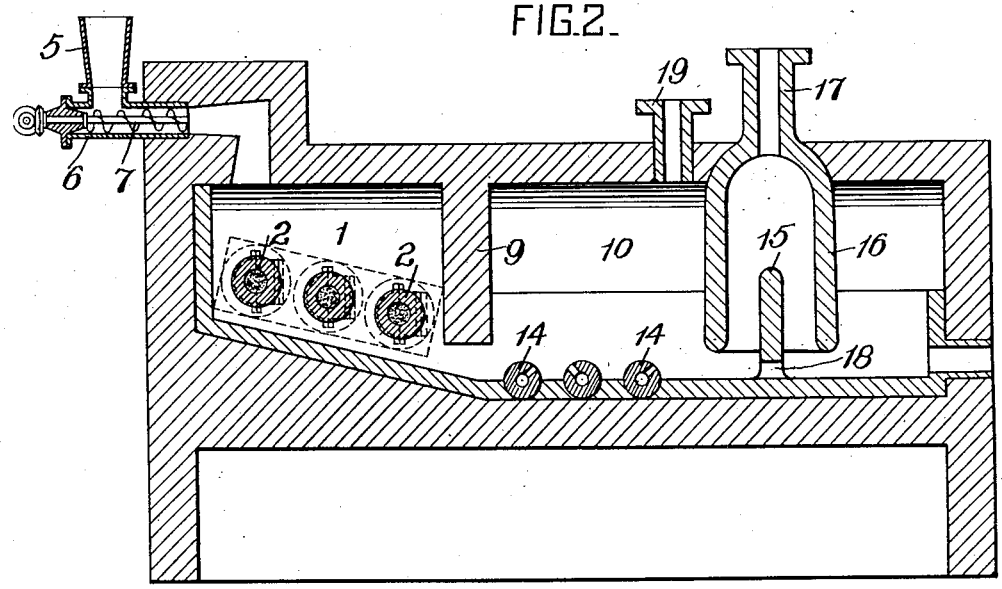
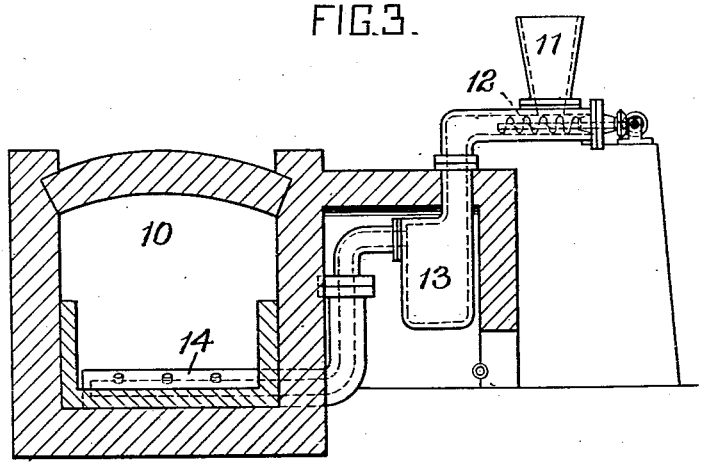
WITNESSES:
Herbert Bradley.
Fred Kirchner.
INVENTOR
Halbert K. Hitchcock,
by Christy & Christy, Atty's

UNITED STATES PATENT OFFICE.

HALBERT K. HITCHCOCK, OF WALTON, PENNSYLVANIA, ASSIGNOR TO HIMSELF AND CHARLES W. BROWN, TRUSTEES, OF PITTSBURG, PENNSYLVANIA.

MANUFACTURE OF GLASS.

No. 805,139.     Specification of Letters Patent.     Patented Nov. 21, 1905.

Application filed June 13, 1904. Serial No. 212,354.

*To all whom it may concern:*

Be it known that I, HALBERT K. HITCHCOCK, a citizen of the United States, residing at Walton, in the county of Allegheny and State of Pennsylvania, have invented or discovered certain new and useful Improvements in the Manufacture of Glass, of which improvements the following is a specification.

The invention described herein relates to certain improvements in the manufacture of glass.

It has heretofore been the practice in the manufacture of glass to thoroughly mix together the several ingredients—*e. g.*, the silica, lime, and alkali—to form the batch and then subject them in a suitable pot or furnace to a fusing and refining temperature. On account of the great difference between the fusing-points of the several ingredients of the batch and the temperature at which they unite to form glass there is always a great loss by volatilization of one or more of the less refractory ingredients. Hence such ingredients must be added in larger quantities to the batch than would be otherwise necessary.

The object of the present invention is to bring the ingredients, the more refractory independently of the less refractory, to a condition of temperature where they will chemically act one upon the other as soon as mixed together.

It is a further object of the invention to provide for the elimination of air or gas bubbles and also for the recovery of commercially-valuable by-products, such as gases, evolved during the production of the glass.

The invention is hereinafter more fully described and claimed.

In the accompanying drawings, forming a part of this specification, Figure 1 is a plan view of a furnace and connections adapted to the practice of my invention. Fig. 2 is a sectional elevation of the same, the plane of section being indicated by the line II II, Fig. 1; and Fig. 3 is a transverse section on a plane indicated by the line III III, Fig. 1.

In the practice of my invention the silica or the silica and lime, if glass having lime is desired, are raised to a temperature at which there will be an elimination of impurities contained in such material or materials and injurious to the desired product. As the melting-points of the silica and lime are above the temperature at which the contained impurities will be volatilized and driven off, it is not necessary to raise the silica or silica and lime materially above such purifying temperature. As the melting-points of the lime and silica are so near together that there will not be any material volatilization of the less refractory if the two are mingled together and raised to the melting-point of the more refractory and as it is not necessary to raise the materials to the melting-point of the less refractory of the two, these materials may be mixed together in the desired proportions when making lime-glass and then purified by high heating, as stated. After the silica or lime and silica have been purified the fluxing-alkali is added thereto, preferably in a fluid condition. If when lime and silica are used they are separately purified, it is preferred to thoroughly mix them together before adding the flux. By the addition of the fluxing-alkali the melting-point of the silica or the mixture silica and lime is lowered considerably below that of either the lime or silica or the silica and lime combined. In general the silica and lime and silica will while being purified be heated to such a temperature that on the addition of the fluxing-alkali the mass will pass immediately into a thoroughly fused or liquid condition, forming glass. On the addition of the fluxing-alkali there will be a considerable evolution of gases which can be utilized, and provision should therefore be made for collecting and storing such gases.

After the glass has been formed as stated the fluid-pressure on its surface is reduced, thereby relieving the tension in the air or gas bubbles in the mass, permitting them to expand and rise to the surface, where they break, and the gas or air may be drawn away.

A convenient apparatus for the practice of my invention consists of a heating or purifying chamber 1, which is preferably heated by granulated carbon cores enveloped in highly-refractory and chemically-inert cases 2, preferably formed of carborundum, passing through the chamber and preferably in proximity to the bottom thereof. These casings are removably arranged in the chamber and are provided at their ends with detachable terminals 3, to which are connected conductors 4, leading to a suitable generator, said terminals contacting with the carbon cores. The silica or lime and silica are preferably charged into the hopper 5, which directs the material or materials to the troughs or tubes 6, having the conveyer-screws 7 arranged therein. These conveyers are driven through suitable interposed mechanism by a motor 8. By this charging mechanism the material or materials can be fed at any desired rate into the chamber, where they are subjected to a purifying temperature which may be as high as the fusing temperature of one or both of said materials. The bottom of the chamber 1 is inclined so that the material or materials when purified will flow under the partition 9 into the fluxing-chamber 10. As the highly-heated silica or lime and silica enter the chamber 10 they come into contact with the fluid fluxing-alkali—e. g., salt cake or soda-ash or salt—and are caused to combine chemically therewith and with each other when lime and silica are used.

The alkali is placed in a hopper 11 and fed therefrom by screw conveyers 12 into the pot or receptacle 13, where it is reduced to a liquid or gaseous condition by heat applied externally to the pot. The fluid alkali flows from the pot into the distributing pipe or pipes 14, which are arranged on the bottom of the chamber 10 and provided with perforations so disposed as to effect a thorough distribution of the fluid flux through the silica or mingled silica and lime. The gases evolved or escaping during the fluxing operation are conducted away by the pipe 19 to a place of storage, use, or treatment. After the glass has been formed by the addition of the flux it is caused to pass over a dam 15, which is arranged under a hood or bell 16, so arranged that its edges will dip down into the glass on both sides of the diaphragm or dam 15. The hood or bell is provided with a neck 17, which is connected to a suitable exhaust mechanism, whereby any desired vacuum may be maintained in the bell or hood. The dam is made of such a height that the glass will be forced over it by the greater pressure in the chamber 10, preferably in a comparatively thin stream, so that any air or gas bubbles held in the glass may readily escape into the bell or hood. Sufficient glass is ladled into chamber 16 to form and maintain a seal with the lower edge of the bell or hood on that side of the dam. By causing the exhaust mechanism to discharge into a suitable receptacle the gases contained in the bubbles may be recovered and utilized.

It will be understood that, while not necessary, both the silica and lime, when both are used, may be highly heated before being mingled together, or either one may be liquefied and the other added thereto either in a solid or liquid condition. In all cases it is preferred that material or materials employed should be purified before the fluxing stage, so as to avoid maintaining the glass for any considerable length of time at a high or purifying temperature, for the reason that glass at such high temperature is an unstable compound and is easily broken up by heat with the evolution of gases. By the purification prior to fluxing the formation of gases except such as are due to fluxing is avoided. By subjecting the glass to a partial vacuum after the fluxing is completed the gas-bubbles consequent on such fluxing are rapidly removed, and hence the glass need be kept in a condition where it is liable to change only a short time.

I claim herein as my invention—

1. As an improvement in the art of making glass, the method described herein, which consists in heating the silica to effect the elimination of impurities and while in said heated condition adding a fluxing-alkali in fluid condition, substantially as set forth.

2. As an improvement in the art of making glass, the method described herein, which consists in heating the lime and silica and while said materials are heated adding a fluxing-alkali in a fluid condition, substantially as set forth.

3. As an improvement in the art of making glass, the method herein described, which consists in heating the more refractory materials to the temperature required for the less refractory to act upon them, heating the less refractory ingredients, and then subjecting the more refractory materials while heated to the fluxing action of the heated less refractory materials, substantially as set forth.

4. As an improvement in the art of making glass, the method herein described, which consists in heating the more refractory materials to the temperature required for fluxing and forcing the less refractory material ingredients up through the heated materials, substantially as set forth.

5. As an improvement in the art of making glass, the method herein described, which consists in heating the lime and silica, adding a fluxing-alkali in a fluid condition to said materials while in a fluid condition, and subjecting the glass thus formed to a reduced surface-pressure, substantially as set forth.

6. As an improvement in the art of making glass, the method herein described which consists in heating the silica to effect the elimination of impurities, vaporizing a fluxing-salt and passing such vapor through the heated silica, substantially as set forth.

7. As an improvement in the art of making glass the method herein described which consists in heating the more refractory materials to the temperature required for fluxing, vaporizing a fluxing-salt and forcing such vapor through the heated materials, substantially as set forth.

In testimony whereof I have hereunto set my hand.

HALBERT K. HITCHCOCK.

Witnesses:
DARWIN S. WOLCOTT,
F. E. GAITHER.